(12) United States Patent
Nurmi et al.

(10) Patent No.: US 10,638,579 B2
(45) Date of Patent: Apr. 28, 2020

(54) POWER SUPPLY SYSTEM

(71) Applicant: Ellego Powertec Oy, Halikko As (FI)

(72) Inventors: Jari Kalervo Nurmi, Turku (FI); Terho Otso Tapio Kaikuranta, Piispanristi (FI)

(73) Assignee: Ellego Powertec Oy, Halikko As (FI)

( * ) Notice: Subject to any disclaimer, the term of this patent is extended or adjusted under 35 U.S.C. 154(b) by 0 days.

(21) Appl. No.: 16/342,219

(22) PCT Filed: Nov. 3, 2017

(86) PCT No.: PCT/FI2017/050759
§ 371 (c)(1),
(2) Date: Apr. 16, 2019

(87) PCT Pub. No.: WO2018/083384
PCT Pub. Date: May 11, 2018

(65) Prior Publication Data
US 2019/0246469 A1    Aug. 8, 2019

(30) Foreign Application Priority Data
Nov. 3, 2016   (FI) ...................................... 20165827

(51) Int. Cl.
*H05B 45/00*     (2020.01)
*H05B 37/02*     (2006.01)
(Continued)

(52) U.S. Cl.
CPC ............ *H05B 45/37* (2020.01); *B64F 1/002* (2013.01); *B64F 1/18* (2013.01); *H02J 7/0068* (2013.01);
(Continued)

(58) Field of Classification Search
CPC ............ H05B 33/0815; H05B 33/0803; H05B 33/0809; H05B 33/089; H05B 33/0851;
(Continued)

(56) References Cited

U.S. PATENT DOCUMENTS 5,239,236 A * 8/1993 Backstrom ........... H05B 37/036
315/185 R
5,485,151 A * 1/1996 Runyon ............. H05B 37/0227
315/130
(Continued)

FOREIGN PATENT DOCUMENTS

CN     102789763 A    11/2012
EP      1211915 A1    6/2002
(Continued)

OTHER PUBLICATIONS

Finnish Patent and Registration Office Search Report of FI20165827, dated May 15, 2017, 2 pages.

*Primary Examiner* — Vibol Tan
(74) *Attorney, Agent, or Firm* — Berggren LLP

(57) ABSTRACT

The invention relates to power supply systems. There is provided an apparatus and a method for supplying electric power to an electric device. In the method an indication of a desired power level to be supplied to the electric device is obtained. Electric power is received as DC power by a constant current regulator unit, which inverts the DC power to AC power and supplies the AC power to a reactance (T1) to be transformed to an output power. The output power is supplied from the reactance (T1) to the electric device. The method further comprises adjusting the AC power supplied to the reactance (T1) by using at least two of the following:
voltage level of the AC power;
the frequency of the AC power;
a waveform of the AC power.

18 Claims, 7 Drawing Sheets

(51) Int. Cl.
*H05B 45/37* (2020.01)
*H05B 47/18* (2020.01)
*B64F 1/00* (2006.01)
*H02J 7/00* (2006.01)
*H05B 47/23* (2020.01)
*H05B 45/10* (2020.01)
*B64F 1/18* (2006.01)
*H05B 47/105* (2020.01)
*H05B 47/185* (2020.01)
*H02M 7/515* (2007.01)

(52) U.S. Cl.
CPC ............ *H02M 7/515* (2013.01); *H05B 45/00* (2020.01); *H05B 45/10* (2020.01); *H05B 47/105* (2020.01); *H05B 47/18* (2020.01); *H05B 47/185* (2020.01); *H05B 47/23* (2020.01); *Y02B 20/347* (2013.01)

(58) Field of Classification Search
CPC ........ H05B 47/23; H05B 45/00; H05B 45/10; H05B 47/105; H05B 47/185; F21W 2111/06; F21Y 2115/10; Y02E 10/56; Y02E 10/563; H01L 31/02021; H02J 1/12; H02J 3/36; H02J 3/383; H02J 4/00; H02J 7/0068; H02J 9/061; H02J 9/065; H02J 3/385; H02J 5/005; H04B 2203/547; H02M 7/515; B64F 1/002; B64F 1/18
See application file for complete search history.

(56) References Cited

U.S. PATENT DOCUMENTS

| | | | |
|---|---|---|---|
| 6,300,878 B1* | 10/2001 | Galloway | H05B 39/044 315/130 |
| 7,192,155 B2* | 3/2007 | Morrow | B64F 1/20 362/153.1 |
| 9,131,584 B2* | 9/2015 | Yu | H05B 33/089 |
| 10,244,594 B2* | 3/2019 | Chawda | B64F 1/20 |
| 2005/0030192 A1* | 2/2005 | Weaver | G09F 9/33 340/815.45 |
| 2008/0272937 A1* | 11/2008 | That | H05B 33/0809 340/947 |
| 2013/0039104 A1 | 2/2013 | Sharma | |
| 2013/0193878 A1 | 8/2013 | Zimmermann | |
| 2013/0249429 A1 | 9/2013 | Woytowitz et al. | |
| 2014/0042923 A1* | 2/2014 | Yu | H05B 33/089 315/201 |
| 2014/0354170 A1 | 12/2014 | Gredler et al. | |
| 2015/0245431 A1 | 8/2015 | Rutgers et al. | |
| 2016/0113086 A1 | 4/2016 | Chitta et al. | |
| 2016/0141964 A1 | 5/2016 | Yu et al. | |
| 2016/0233719 A1* | 8/2016 | Guckin | H02J 9/061 |
| 2016/0381772 A1* | 12/2016 | Runyon | B64F 1/20 315/294 |
| 2017/0311427 A1* | 10/2017 | Chawda | H05B 33/0887 |
| 2018/0049292 A1* | 2/2018 | Chawda | H05B 37/02 |

FOREIGN PATENT DOCUMENTS

| | | |
|---|---|---|
| WO | 01/63977 A1 | 8/2001 |
| WO | 2016/020432 A1 | 2/2016 |

\* cited by examiner

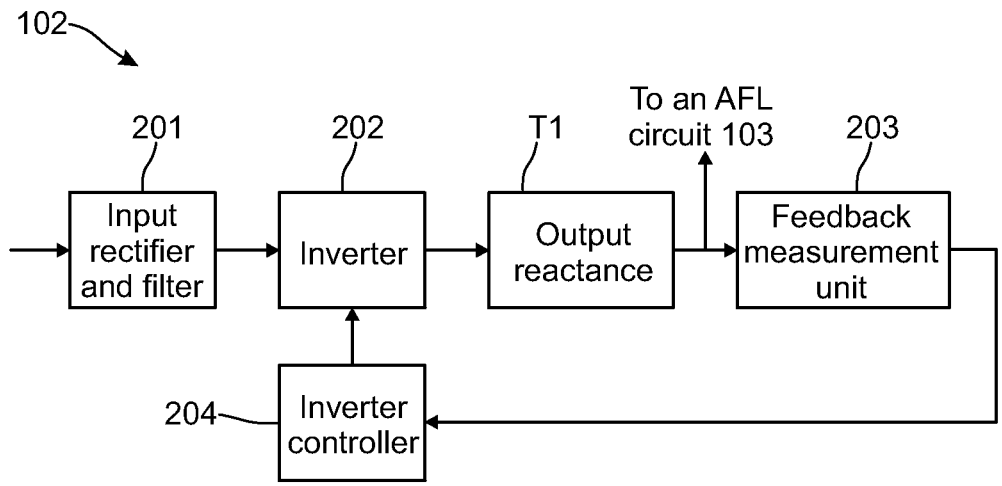
Fig. 2
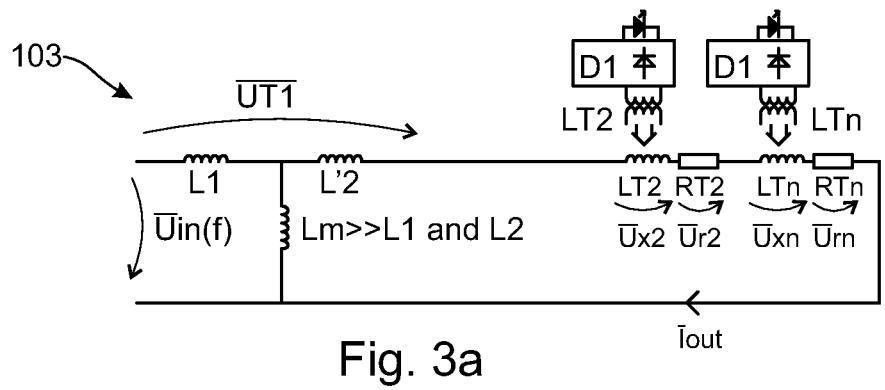
Fig. 3a
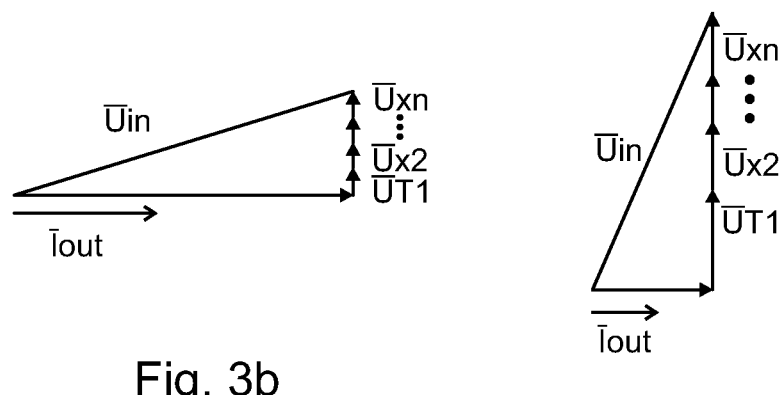
Fig. 3b
Fig. 3c

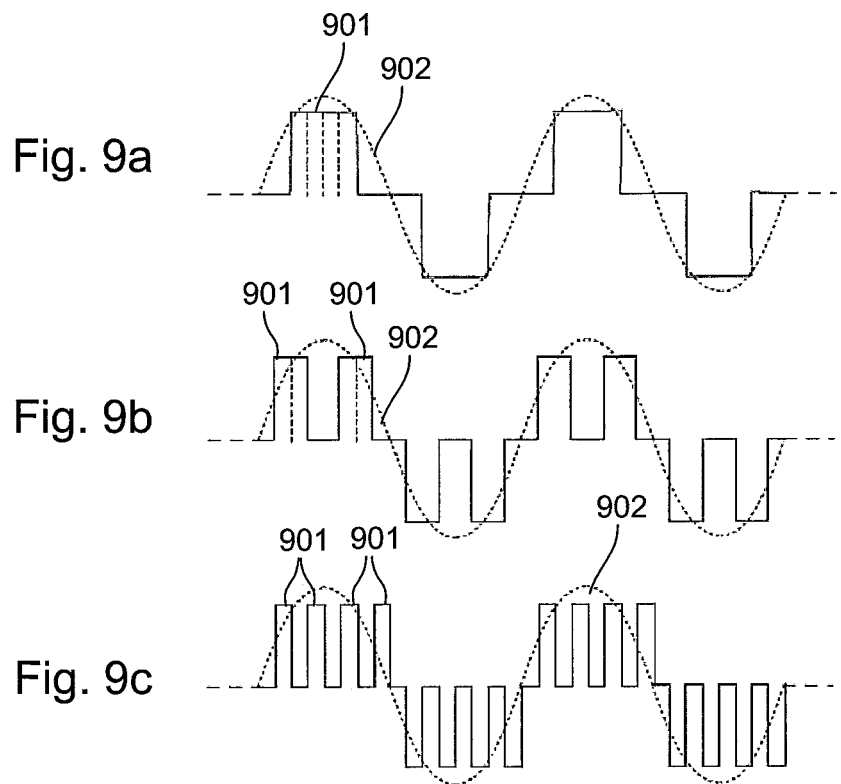
Fig. 9a
Fig. 9b
Fig. 9c
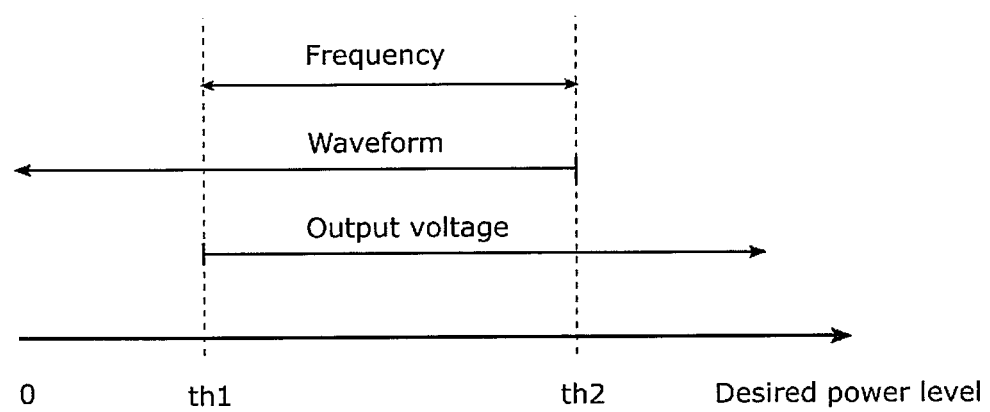
Fig. 10

POWER SUPPLY SYSTEM

PRIORITY

This application is a U.S. national application of the international application number PCT/FI2017/050759 filed on 3 Nov. 2017, which claims priority of Finnish application FI20165827 filed on Nov. 3, 2016, the contents of all of which are incorporated herein by reference.

TECHNICAL FIELD

The present invention relates to an apparatus for supplying electric power to an electric device. The invention also relates to a method for supplying electric power to an electric device and a system.

BACKGROUND

In some power supply systems electric power is supplied from a power source to an electric or electronic device via a switchboard and a converter circuit. Some examples of the power source are a power network (an electrical grid), an electric generator (e.g. a diesel generator), batteries, solar cells and/or wind turbines. The electrical grid usually transfers electric power as an AC voltage (alternating current) whereas electric generators usually produce AC voltage (alternating current), and batteries and solar cells usually produce DC voltage (direct current) wherein a DC/AC inverter may be needed to convert the DC voltage to AC voltage before the power can be supplied to the switchboard. In these kinds of systems the electronic device may, however, operate with DC voltage, wherein a rectifier may be needed to convert the AC voltage to DC voltage before supplying the power to the electronic device. The rectifier may be a part of the electronic device or it may be a separate unit.

An example of the above mentioned power supply system has been used at many airports for supplying power to lamps located on and around runways and taxiways i.e. to the airfield lighting (AFL). These lamps or lights are used to illuminate location, layout, shape and purpose of runways and taxiways so that airline pilots can operate in all conditions, especially in dark, low light and low visibility conditions.

The amount of electrical power fed to an airfield lighting circuit may be regulated by adjusting the output current to the required level. This may be performed by a constant current regulator unit (CCR) so that the output current of the constant current regulator unit regulates also intensity of lamps at runways and taxiways. Several specified intensity levels are used as defined in related standards. Required airfield light intensity level for any given flight operation moment is defined by air traffic control at the airport. A required, regulated by standards taxiway lamp light intensity range is 2.8 A (1%)-6.6 A (100%). The lower light intensity level approx. 10% 0.66 A is practical minimum limit with some prior art LED lamps due to difficulties in implementing good power regulation performance for airfield lighting output current level at lower 10%-1% light intensity. This means that runway lights cannot be directly set to required minimum 1% level by such prior art LED lamps by only using constant current regulator unit output. Thus, a separate active power control function measuring airfield lighting circuit current and performing further power reduction is used inside each LED unit. FIG. 6 illustrates an example of illumination intensity as a function of input current for halogen lights (curve 601) and for led lights (curve 602). In this example, for halogen lamps the current level 4.1 A corresponds about 10% illumination level, the current level 3.4 A corresponds about 3% illumination.

Existing technical problem in some prior art at low LED light intensity levels: If current is controlled by PWM method, it may produce visible blinking and stroboscope effects which interfere airline pilots. Blinking is created by PWM pulse ratio, which has OFF time significantly longer than ON time. This blinking is more visible with lower AFL circuit frequency, e.g. supply network frequencies. Therefore, using PWM at low LED light intensity levels is today difficult as PWM adjustment resolution is getting practically too low.

SUMMARY

An aim of the present invention is to provide an improved power supply system and an apparatus for supplying electric power to an electric device and to make it possible to directly feed power to LED lamps by using only an output of the constant current regulator unit. The invention is based on the idea of adjusting a frequency of an AC current when a desired power level is at a first side of a threshold. The present invention aims to provide a solution to the above mentioned problem by using an output frequency of a constant current regulator as an additional controlling method. In accordance with an embodiment, light intensity control can follow airfield lighting circuit current in e.g. 100%-10% intensity range, and additionally using the constant current regulator output frequency based light intensity control in the range <10%.

In accordance with a first aspect of the present invention there is provided an apparatus for supplying electric power to an electronic device, the apparatus comprising:
  means for obtaining an indication of a desired power level to be supplied to the electric device;
  an input for receiving electric power as DC power;
  an inverter for inverting the DC power to AC power;
  means for supplying the AC power to a reactance to be transformed to an output power;
wherein the apparatus further comprises:
  means for adjusting the AC power supplied to the reactance by using at least two of the following:
    voltage level of the AC power;
    the frequency of the AC power;
    a waveform of the AC power.

In accordance with a second aspect of the present invention there is provided a method for supplying electric power to an electric device, the method comprising:
  obtaining an indication of a desired power level to be supplied to the electric device;
  receiving electric power as DC power by a constant current regulator unit;
  inverting the DC power to AC power;
  supplying the AC power to a reactance to be transformed to an output power;
  and supplying the output power from the reactance to the electric device;
wherein the method further comprises:
  adjusting the AC power supplied to the reactance by using at least two of the following:
    voltage level of the AC power;
    the frequency of the AC power;
    a waveform of the AC power.

In accordance with a third aspect of the present invention there is provided a system comprising:

one or more electric devices;
an apparatus for supplying electric power to the one or more electric devices;
means for obtaining an indication of a desired power level to be supplied to the electric device;
an input for receiving electric power as DC power;
an inverter for inverting the direct current to AC power;
means for supplying the AC power to a reactance to be transformed to an output power;
wherein the system further comprises:
means for adjusting the AC power supplied to the reactance by using at least two of the following:
voltage level of the AC power;
the frequency of the AC power;
a waveform of the AC power.

The present invention has several advantages some of which will be described in the following detailed description.

BRIEF DESCRIPTION OF THE DRAWINGS

In the following the present invention will be described in more detail with reference to the appended drawings in which

FIG. 2 illustrates as a simplified block diagram a constant current regulator, in accordance with an embodiment;

FIG. 3a depicts an equivalent circuit of an output transformer and an airfield lighting circuit, in accordance with an embodiment;

FIG. 3b depicts output current of the airfield lighting circuit of FIG. 3a as a function of input voltage at a first frequency, in accordance with an embodiment;

FIG. 3c depicts output current of the airfield lighting circuit of FIG. 3a as a function of input voltage at a second frequency, in accordance with an embodiment;

FIGS. 9a-9c illustrate some examples of including information into output power; and FIG. 10 illustrates an example of a power control principle in accordance with an embodiment.

DETAILED DESCRIPTION

Figure 1A:
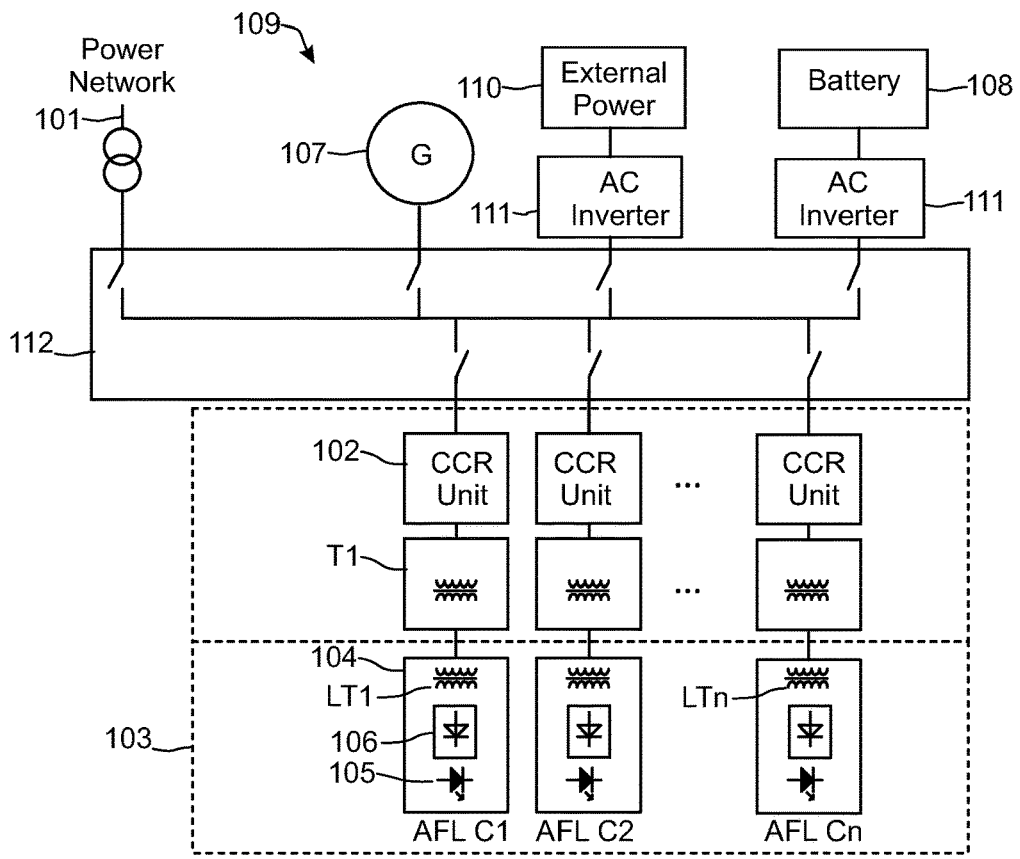
FIG. 1a depicts an example principle of providing electrical power for airfield lighting.

FIG. 1a shows an example principle of providing electrical power for an airfield lighting system 103. The following functional technical blocks are shown in FIG. 1a. The power network 101 is a primary electrical power source at the airport. This may represent a national electrical grid that may feed all electrical systems. It is possible that the airport has separate local sections or an internal electrical substation or substations. A common practice is to have AC voltage networks at 50 Hz or 60 Hz. A constant current regulator unit 102 (CCR) is an electrical power supply unit that may deliver power to one of the airfield lighting circuits 104. The airfield lighting circuit 104 (AFL C1 . . . AFL Cn) may comprise a plurality of lamps 105 and corresponding control electronics LT1, 106. The lamps and control electronics may also be called as a lamp circuit in this specification. The constant current regulator unit 102 may also be called as a constant current inverter or CCR inverter in this specification. Units with different power ratings can be used. The constant current regulator unit 102 sets at its output actual power to be delivered to airfield lighting circuits 104 to obtain desired lamp intensity level. In other words, the output current from the constant current regulator unit 102 can be used to control illumination intensity of the illumination device 105 of the airfield lighting circuits 104. The illumination devices 105 may also be called as lamps in this specification.

The airfield lighting circuit 104 may comprise a lamp transformer LT1 . . . LTn (FIG. 3a), a rectifier circuit 106, if any, and the illumination device 105, e.g. a LED.

In the example of FIG. 1a a diesel generator 107 can be used as an alternative power source for situations when primary power network might not be available. The use of diesel generator may increase overall system redundancy and reliability. Diesel generators typically produce AC output and thus a rectifier is used to convert electrical AC power to DC power so that it can be connected to a DC distribution bus at a correct voltage level. Use of diesel generators may have disadvantages of consuming fuel and they wear, which both may increase operating and maintenance costs and output of exhaust gas.

Batteries/Energy storage 108 may be used for storing energy in electrochemical form and it is connected to the power supply system for backup of power delivery for the airfield lighting. Practically any battery technology may be used as long as a suitable charging method is used. Batteries/Energy storage can have a separate own battery charger.

Solar power system 110 is an example of another additional local energy production method that may be connected to the power supply system for airfield lighting.

Figure 1B:
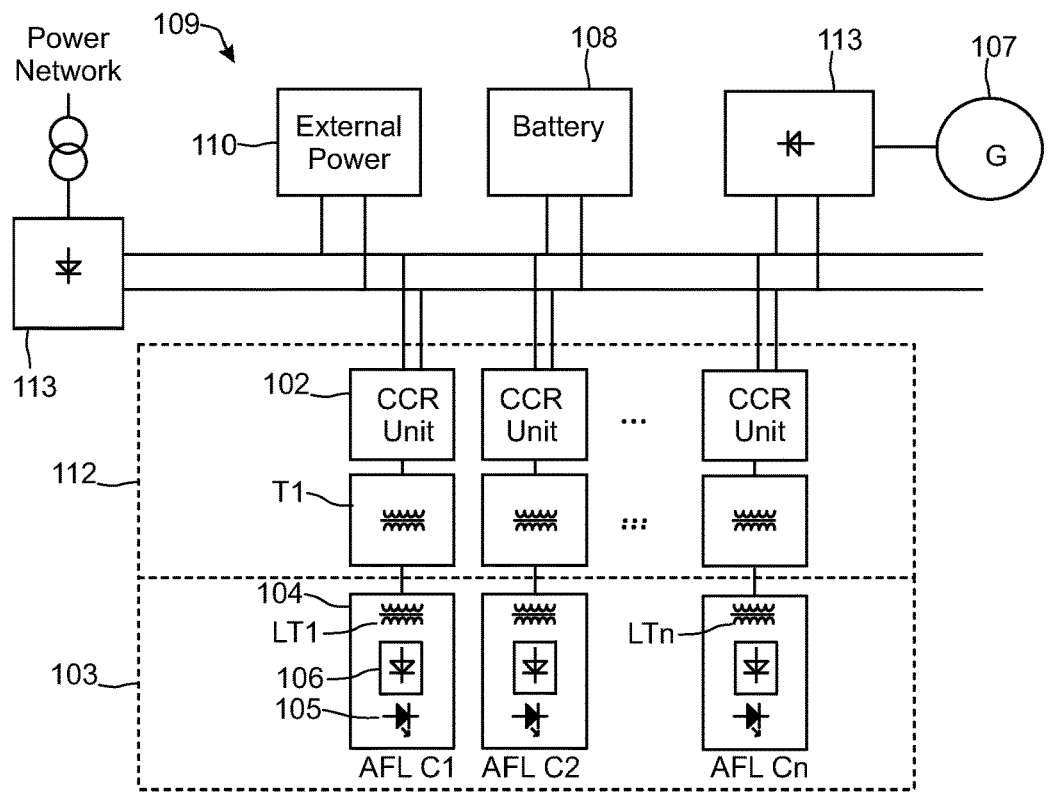
FIG. 1b depicts another example principle of providing electrical power for airfield lighting.

Different electricity sources may be coupled to an airfield lighting constant current regulator system 109 (AFL CCR system) through a switchboard 112, for example. Electricity (electric power) to be supplied to the airfield lighting constant current regulator system 109 may be AC voltage (and current), as is illustrated in FIG. 1a, or DC voltage (and current) as is illustrated in FIG. 1b. If AC voltage is used, the power sources which produce DC voltage are coupled to DC/AC inverters 111, as is depicted in FIG. 1a, to convert the DC voltage to AC voltage. On the other hand, If DC voltage is used, the power sources which produce AC voltage are coupled to rectifiers 113 (FIG. 1b) to rectify the AC voltage to DC voltage.

The airfield lighting circuit 104 (marked by AFL Cn in FIG. 1a) means interconnected illumination devices 105 (lamps) along the runways and taxiways and corresponding control circuitry, which is used for delivering power to the illumination devices 105. Intensity of the illumination devices 105 may be controlled by adjusting the electrical current fed through the airfield lighting circuit 104. The illumination devices 105 may be halogen lamps, light emitting diodes (LEDs) or any suitable illumination technology, or any combination of such lamps 105. The illumination devices may be serially connected, parallel connected, or both serially and parallel connected e.g. in such a way that a set of illumination devices are connected in series and such sets are connected in parallel. However, in this specification it is assumed that all the illumination devices 105 which are driven by one control circuitry, are connected in series.

The airfield lighting constant current regulator system 109 means a complete power supply system shown in FIG. 1a. It may comprise a multiple of constant current regulator units 102 used at the airfield electrical substations. One or more airfield lighting constant current regulator systems 109 (subsystems) can be used at airfields.

The constant current regulator 102, which may also be called as a constant current inverter or a CCR inverter in this specification, is an electrical device, which converts electrical power from DC input to AC output. This device may be implemented with a switched mode power supply (SMPS) technology. An output frequency, output voltage and/or output current of the constant current regulator 102 may be adjusted at a design phase and/or one or more of these properties may be adjusted during run time as needed.

In accordance with an embodiment, the voltage to be supplied to the airfield lighting circuit 104 is at a level of several kilovolts making it impractical to design the constant current regulator 102 so that it could directly supply the airfield lighting circuit. Hence, an output transformer T1 may be used at the output of the constant current regulator 102 to provide high enough voltage for the airfield lighting circuit. Therefore, in addition to the constant current regulator 102 itself, the output voltage of the constant current regulator 102 may be adjusted by the output power transformer T1 which may be specified during the constant current regulator 102 design and may be a power transformer. Additionally, the output transformer T1 may also act as an electrical safety isolator between the constant current regulator 102 and the airfield lighting circuit 104.

The amount of electrical power fed to the airfield lighting circuit 104 may be regulated by adjusting the output current to a required level. This constant current regulator output current may also regulate the intensity of lamps at runways and taxiways. Several specified intensity levels may be used as defined in related standards. The required light intensity level for any given flight operation moment may be defined by air traffic control at the airport.

Power delivering capacity of the power supply system may be designed as needed. For example, power levels of one airfield lighting circuit 104 may be in the range of 1-40 kVA. Different constant current regulators 102 may have different power delivery capacity within the complete airfield lighting system 109. It should be noted here that the present invention can also be implemented in systems in which the power levels are in a range different from 1-40 kVA.

The constant current regulators 102 implemented with switched mode power supply (SMPS) technology may be equipped with power factor correction (PFC) function/circuit, which may reduce total power consumption as compared with thyristor based constant current regulators and the constant current regulators 102 may automatically adapt to connected airfield lighting load level which cannot be done in thyristor based constant current regulators. Therefore, system power efficiency may be increased.

The constant current regulators 102 may be able to use AC or DC form electrical supply. If a DC supply is used, it may be possible to reduce constant current regulator costs and complexity. Furthermore, the constant current regulators 102 need not be tied to power network frequency.

In the following the operation of the power supply system will be described in more detail. In this example, the power supply system may have two or more different operating modes so that in a first mode LED light intensity can be directly controlled by the constant current regulator 102 output current, and in a second mode LED light intensity can be controlled by the constant current regulator 102 output frequency. This may be beneficial especially with taxiway lights, because required (regulated by standards) taxiway lamp light intensity range is 0.66 A (10%)-6.6 A (100%) which may be relatively easy to control by the constant current regulators 102 output (even with lower levels are possible), and light intensities below the 10% limit the taxiway lamp light intensity may be controlled by adjusting the frequency of the output of the constant current regulator 102. There may also be a third mode in which LED light intensity can be controlled by waveform. Additional modes may be a combination of two of the three modes, or even a combination of all three modes.

The mentioned lower light intensity level approx. 10% is just an example and may be a practical minimum limit in airfield lighting circuits due to difficulties in implementing good power regulation performance for current levels which should produce light intensity which is lower than 10% of the maximum (100%) intensity. However, in some other implementations the level which defines which of the two (or more) different modes is used, may be different from 10%.

FIG. 2 illustrates as a simplified block diagram a constant current regulator 102, in accordance with an embodiment. An input AC voltage is rectified by a rectifier 201 to a DC voltage to be supplied to an inverter 202. However, if the DC based system illustrated in FIG. 1b is used, the rectifier 201 is not needed at this stage but the electric power may be coupled directly to the inverter 202. The inverter 202, which may also be called as a chopper, converts the DC voltage to AC voltage at a frequency f, which may be controllable. The AC voltage from the inverter 202 is output to a primary winding of an output transformer T1. The output transformer T1 may be specified during the constant current regulator design and may be a power transformer. Additionally, the output transformer T1 may also act as an electrical safety isolator between the constant current regulator 102 and the airfield lighting circuit 104. An output from the output transformer T1 may be coupled to a feedback loop 203, which may comprise, for example, a rectifier to convert the AC output voltage to a DC voltage, and a filter for filtering the DC voltage into a DC reference voltage. An inverter controller 204 may use the DC reference voltage to control the operation of the inverter 202. For example, the inverter controller 204 may cause the inverter 202 to change the output voltage to keep the output current at a constant level. The inverter controller 204 may also provide a control signal to the inverter 202 to adjust the frequency of the output voltage of the inverter 202.

The secondary winding of the output transformer T1 may also be connected to the airfield lighting circuit 104, Hence, the output of the secondary winding of the output transformer T1 is used as a power supply to the airfield lighting circuit 104. Control of the output of the inverter 202 and hence the secondary winding of the output transformer T1 will be described below in this specification.

The output transformer T1 may be designed so that it has a maximum power transmission capacity at a selected nominal frequency $f_n$. By a proper transformer design and specification good match between inverter frequency, transformer behaviour, airfield lighting circuit 104 and LED light intensity control performance may be obtained. As an additional benefit a decreased size and weight of the transformer T1 may be obtained compared to some prior art designs.

In the following, the operation of the constant current regulator 102 will be described in more detail, in accordance with an embodiment. An indication of a required power level at an airfield lighting circuit 104 may be received e.g. from a local or remote airfield control system, from an airport traffic control tower or from another source such as an environment light sensor or an airfield automation system. These non-limiting examples of possible control sources are not shown in the Figures. Each airfield lighting circuit 104 may be controlled independently, wherein each constant current regulator 102 may receive an own light intensity control signal, but the operation of each of the constant current regulators 102 may be similar, wherein it is sufficient to use only one constant current regulator 102 as an example here. The inverter controller 204 examines the light intensity control signal to determine the desired illumination level for the lights of that particular airfield lighting circuit 104 which this constant current regulators 102 is coupled with. If the light intensity control signal indicates that the desired illumination level is less than or equal to a threshold, the inverter controller 204 controls the inverter 202 to adjust the output frequency to a value which produces a desired light intensity by the lamps of the airfield lighting circuit 104. In accordance with an embodiment, the frequency in that situation is above the nominal frequency $f_n$ of the transformer T1. On the other hand, if the light intensity control signal indicates that the desired illumination level is higher than the threshold, the inverter controller 204 controls the inverter 202 to adjust the output current but keep the frequency at or below the nominal frequency $f_n$ so that the desired light intensity by the lamps of the airfield lighting circuit 104 would be obtained.

In accordance with an embodiment, the light intensity control utilizing inverter 202 output frequency variation alters the amount of edges per time unit existing in the inverter 202 voltage output and transformer T1 output voltage. Sharp edges in the mentioned voltage inherently means presence of higher frequency components, known as harmonic frequencies, which will further contribute to the airfield lighting current reduction effect and thus to light intensity reduction. This phenomenon occurs both in the switched mode power supply implementation, and with a thyristor based implementation, as the amount of inverter 202 voltage output and transformer T1 output voltage edges increase along the higher frequency in both implementation alternatives.

Figure 8A:
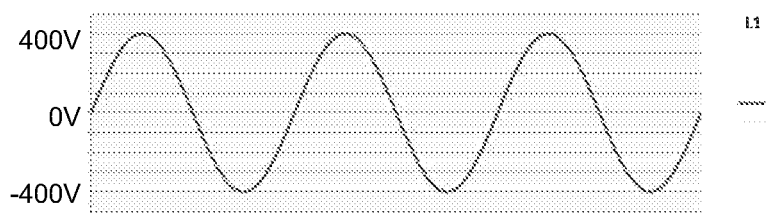
FIGS. 8a-8d illustrate example waveform for illumination intensity control as a function of voltage, frequency and/or waveform, in accordance with an embodiment.
Figure 8B:
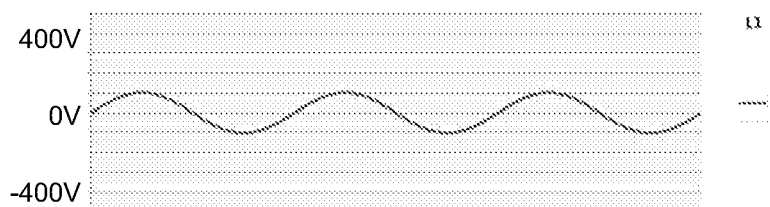
Figure 8C:
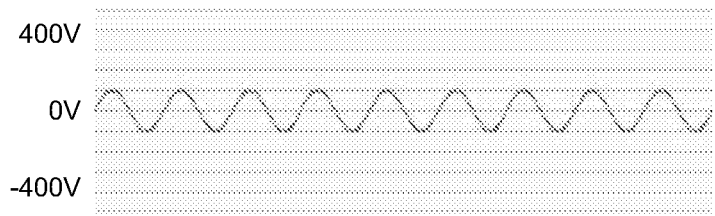
Figure 8D:
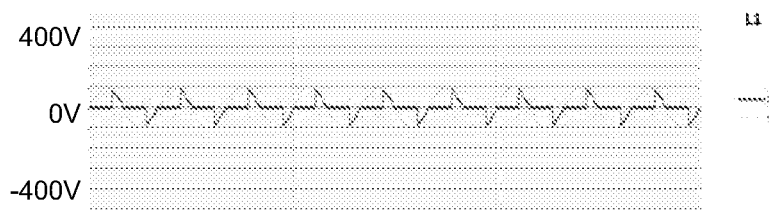

FIGS. 8a-8d illustrate example waveform for illumination intensity control as a function of voltage, frequency and/or waveform, in accordance with an embodiment. In FIG. 8a a first frequency, e.g. 50 Hz is used and the AC voltage is sinusoidal and varies between −400 V and 400 V i.e. the voltage is 800 Vpp. In FIG. 8b the same frequency is used but the voltage level is lower, in this example the AC voltage varies between about −100 V and 100 V. In FIG. 8c the voltage level is about the same than in the example of FIG. 8b but the frequency is tripled i.e. about 150 Hz. In FIG. 8d the voltage level and the frequency is about the same than in FIG. 8c but the waveform is different from the waveforms used in examples of FIGS. 8a-8c. The waveform of FIG. 8d may be achieved by switching the voltage at the output after a certain delay has lapsed when the voltage has crossed the 0 V level. This kind of operation is implemented e.g. by a thyristor based control circuitries but also other methods and waveforms may be used.

FIG. 3a depicts an equivalent circuit of the output transformer T1 and the airfield lighting circuit 104, FIG. 3b depicts output current of the airfield lighting circuit 104 of FIG. 3a as a function of the input voltage at a first frequency, which is e.g. the nominal frequency $f_n$, and FIG. 3c depicts output current of the airfield lighting circuit of FIG. 3a as a function of input voltage at a second frequency, which is higher than the nominal frequency $f_n$, in accordance with an embodiment. It can be seen that when the output frequency is above the selected nominal frequency $f_n$ of the transformer T1, the reactive impedance of the transformer T1 and lamp transformers ($LT_n$, in FIG. 3a) increase and thus reduces current in the airfield lighting circuit 104. This leads to limited light intensity. The reactive impedance increases because of the leakage inductances increase along increasing frequency.

The equivalent circuit of the transformer T1 comprises a first impedance L1, a second impedance L'2, and the mutual impedance $L_m$. It can be assumed that the mutual impedance $L_m$ is much higher than the first impedance L1 and the second impedance L'2 (Lm>>L1 and Lm>>L2). The total impedance of the equivalent circuit can be expressed as follows:

$$Z = R + j\omega L = RT2 + \ldots + RTn + 2\pi f(L_1 + L'_2 + LT2 + \ldots + LTn)$$

$$\omega = 2\pi f$$

$$\bar{I} = \overline{U}In/Z$$

Terms present in the equation and in FIGS. 3a, 3b and 3c are as follows:
Z=total impedance of the equivalent circuit;
T1=inverter output transformer
$L_1$=leakage inductance of the primary winding of the output transformer T1
$L'_2$=leakage inductance of the secondary winding of the output transformer T1
Lm=magnetization inductance of the T1
UT1=voltage over the T1 (note: equivalent circuit shown with voltage ratio 1:1)
T2-Tn=lamp transformers
LT2=inductance of lamp transformer T2
LTn=inductance of lamp transformer Tn
Uin=input voltage for the airfield lighting circuit (at output point of the inverter 102)
UT2=voltage over lamp transformer T2
UTn=voltage over lamp transformer Tn
Ur2=voltage over resistive load RT2 at lamp transformer T2
Urn=voltage over resistive load RTn at lamp transformer Tn
Ux2=voltage over reactance load RT2 at lamp transformer T2
Uxn=voltage over reactance load RTn at lamp transformer Tn
Iout=current in the airfield lighting circuit
D1=LED in a lamp (diode)
n=index, 1, 2, . . . N, N=max amount of lamp transformers.

The inverter output voltage is effective at transformer T1 input. The effective voltage Uin at the airfield lighting circuit input is the sum of voltage vectors UT1+UT2+ . . . +UTn. The voltage over the lamp transformer UTn consists of two voltage vectors Urn and UXn. The impedance of the airfield lighting circuit 104 increases along increasing frequency of the inverter output voltage, according to the vector sum Uin=Iout*(R+jωL).

In accordance with an embodiment, the transformer T1 need not be a transformer having a primary and a secondary windings but also another kind of reactance may be used instead.

It is assumed that the resistance R is constant and thus independent of the inverter output voltage frequency. Furthermore, jωL is dependent of the inverter output voltage frequency, as ω=2πf and f=frequency, j=imaginary unit. The voltage over all inductances (L1, L'2, LT2, . . . , LTn) increases as a function of the frequency so that the higher the frequency the higher the reactance. As a result, the higher reactance leads to a reduced airfield lighting circuit current, and therefore lower light intensity in the airfield lighting circuit 104.

Figure 3D:
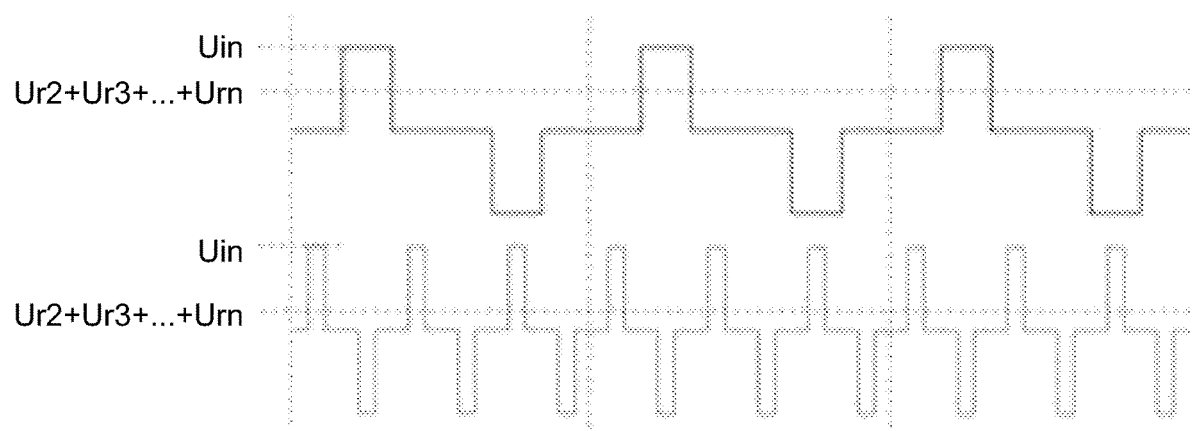
FIG. 3d depicts waveforms of an input voltage at two different frequencies, in accordance with an embodiment.

FIG. 3d depicts waveforms of an input voltage at two different frequencies, in accordance with an embodiment. The effective LED voltage is expressed as Ur2+Ur3+ . . . +Urn (light intensity), which will decrease along higher airfield lighting circuit frequency, as the inductive load will alter distribution of the voltage between vectors Ur2 and UX2, Ur3 and UX3, . . . , Urn and UXn.

Figure 5:
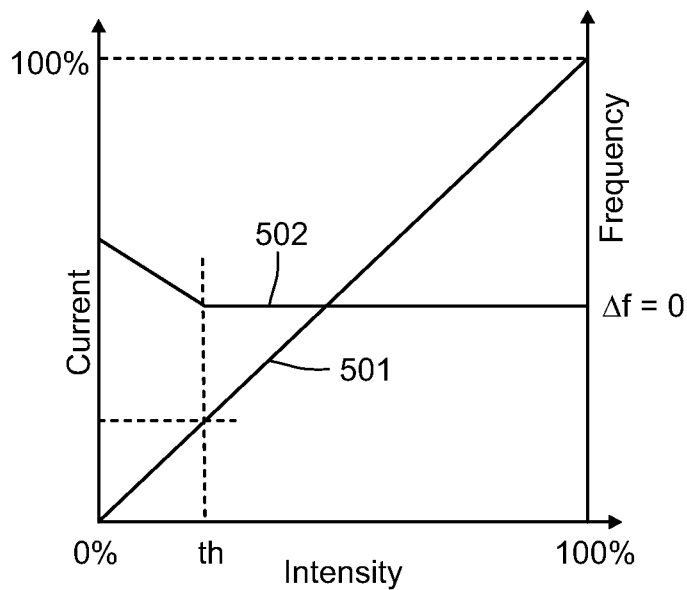
FIG. 5 depicts LED light intensity control as a function of inverter output current and frequency, in accordance with an embodiment.
Figure 6:
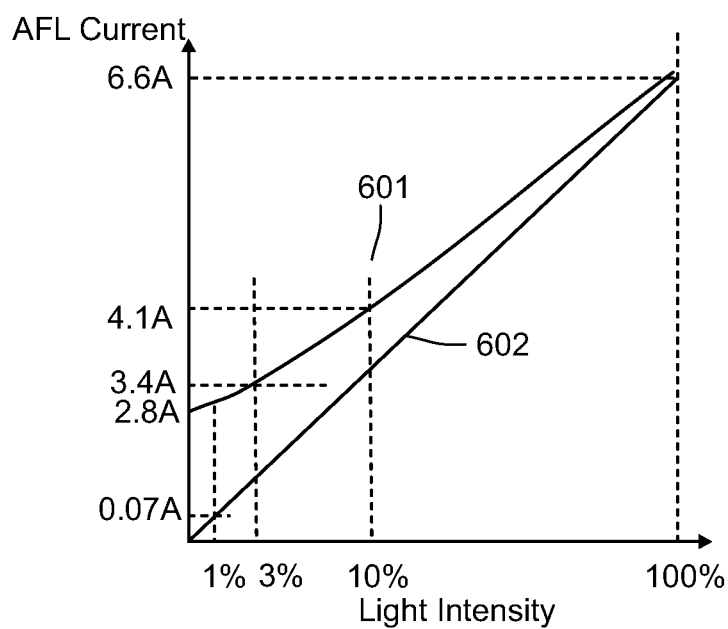
FIG. 6 illustrates an example of illumination intensity as a function of input current for halogen lights and for led lights.

FIG. 5 depicts LED light intensity control as a function of inverter output current and frequency, in accordance with an embodiment. It can be seen that when the desired light intensity is smaller than or equal to the threshold th, the output frequency may be adjusted, and when the desired light intensity is higher than the threshold th, the output frequency may be kept constant but the output voltage may be adjusted. The output current is depicted with the line 501 and the frequency is depicted with the line 502.

The inverter output frequency of each airfield lighting circuit can be separately adjusted. Hence, it may be possible to adjust the intensities of different LED colours so that required light intensity can be produced for different LED colours and same kind of lamp transformers can be used with different light colours. This also means that power limiting function is not needed in the light units 105.

It is possible to use sinusoidal waveform at the inverter output voltage or a waveform different from the sinusoidal waveform. Selection of the inverter output voltage waveform may be a part of the control method design.

It should be noted again that the mentioned 10% intensity level is only an exemplary limit here but any other feasible intensity level value may be used instead. The exact value of this threshold value may depend on the connected airfield lighting circuit 104 load compared to the inverter output power rating. Thus, it may depend on e.g. runway length and number of lamps in the airfield lighting circuit 104.

As a further advantage, the lamp units 105 do not need to have airfield lighting circuit current measurement methods at all. This solution produces very reliable, relatively simple and low cost light intensity control method and light unit products.

Figure 4A:
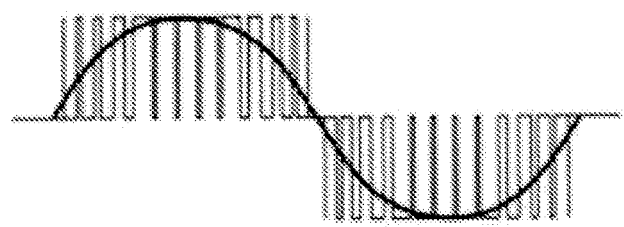
FIGS. 4a-4d depict different pulse width modulation waveforms which may be used in an inverter, in accordance with an embodiment.
Figure 4B:
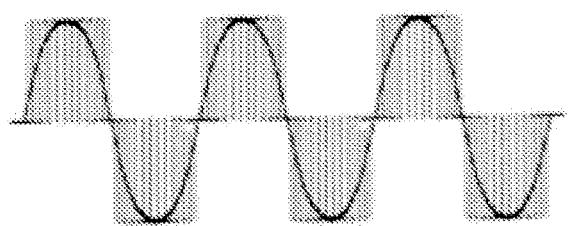
Figure 4C:
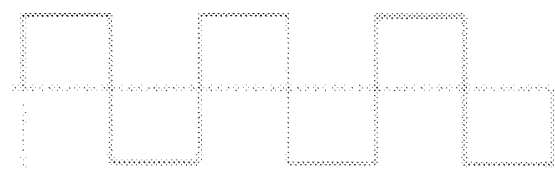
Figure 4D:
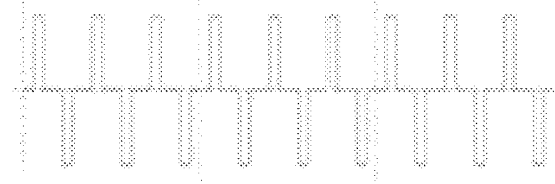

FIGS. 4a to 4d depict different pulse width modulation waveforms which may be used in the inverter 102, in accordance with an embodiment. In FIG. 4a, a pulse width modulation signal at N Hz (N=any number) is used to produce the sinusoidal waveform. The pulse width corresponds the amplitude of a target waveform. When this pulse width modulation waveform passes through a filter, the resulting waveform is approximately sinusoidal. In FIG. 4b, a pulse width modulation signal at 3N Hz (N=any number) is used to produce the sinusoidal waveform. In this example the number of PWM pulses and therefore inverter switching rate increases significantly. This may produce EMI interferences (Electro Magnetic Interferences) and switching losses, which may lead to lower energy efficiency. In FIG. 4c, a square pulse at 3N Hz is depicted. FIG. 4d depicts a PWM with square pulse at 3N Hz. This waveform can also be used for amplitude adjustment (voltage) by changing the PWM pulse width ratio. This waveform may produce less EMI interferences and switching losses, which may lead to better energy efficiency.

As was mentioned before in this specification, it may be possible to use, not only the frequency and/or voltage adjustment, but also different waveforms of the output current to achieve the illumination adjustment. Such a waveform control may be used e.g. as an additional control method together with the frequency and/or the voltage control, or the waveform control may be used e.g. at a certain illumination intensity range. As an example of the latter, the waveform control may be implemented when the desired illumination level is much less than the threshold i.e. below a second threshold (e.g. 1%), wherein the frequency control may be used when the desired illumination level is between the second threshold and the previously mentioned threshold (e.g. 10%).

In accordance with an embodiment, the apparatus comprises means for comparing the desired power level to a first threshold and to a second threshold, wherein the means for adjusting the AC power are adapted to adjust the frequency to obtain the desired power level, if the desired power level is between the first threshold and the second threshold, adjust the waveform to obtain the desired power level, if the desired power level is below the second threshold, and adjust the output voltage to obtain the desired power level, if the desired power level is higher than the first threshold. The first threshold can be smaller than the second threshold, whereby also the waveform and the output voltage can be adjusted when the desired power level is between the first threshold and the second threshold. The first threshold can be larger than the second threshold, whereby only the frequency is adjusted when the desired power level is between the first threshold and the second threshold. The threshold driven dual parameter control significantly improves lamp transformer performance at low current levels and allows a driverless LED lamp unit.

The functionality of the power control for each AFL circuit can be calibrated. Initial CCR calibration can be done, for example, during CCR commissioning. Initial calibration can be made for interlinking the AFL current with the AFL light intensity. Threshold values can be defined in such a manner that the CCR measures the AFL circuit in question and sets optimal operating parameters based on the acquired complex impedance values. Threshold setting can be done while the CCR is starting, or specifically required, for example, during commissioning.

Calibrated operating parameters under a normal AFL circuit condition are needed for fault detection. An abnormal AFL circuit condition can be used to detect faults. For example, the type of the fault can be determined if the AFL current is out of normal level and/or uses more/less capacitive or inductive current path. A diagnostic feature can be created for the CCR.

An open AFL circuit can be detected as an open circuit that creates a capacitive current coupling to earth. The CCR can perform a test measurement with a small AFL current for detecting the AFL circuit continuity and possible lamp faults. Open main circuit and open lamp circuit (i.e. open secondary circuit of the AFL transformer) faults can be detected against calibration curves. Scanning/measurement is preferably done with a low light intensity.

An advantage of the present invention is that it allows to use AFL currents in a low light intensity range, such as in the range of 0-3 A. Another advantage of the present invention is that it allows to design simpler and cheaper AFL bulb and current monitoring systems. Still another advantage of the present invention is that it can provide power for long AFL circuits and cablings. It also produces a stable electrical behaviour of the AFL circuit. Yet another advantage of the present invention is that it can use a higher frequency with a lower current, which allows an accurate control of low current levels. Also, with a continuous waveform current control, the effects of the cable capacitance can be reduced. As the cable capacitance also changes along aging, this makes an expected life time of the cabling significantly longer.

In accordance with an alternative embodiment, a passive power adjustment inside lamp units 105 may be used. Such a passive circuit may be, for example, an LC circuit tuned for a required correct frequency threshold $f_n$. The LC circuit is capable of internally and independently controlling LED current in any airfield lighting unit and controlled by the frequency supplied to the airfield lighting circuit 104. The LC circuit limits LED current when the frequency increases.

In accordance with yet another alternative embodiment, active power adjustment inside lamp unit 105 may be used. Hence, the inverter output frequency is kept at the nominal value $f_n$ and the circuit current is kept substantially at a certain value. An active circuit may comprise, for example, a frequency detection circuit that controls the PWM input of the LED power controller, tuned for the required correct frequency difference threshold $f_n$.

The frequency detection circuit is capable of internally and independently controlling LED power in the light unit 105 according to changes in the frequency supplied to the airfield lighting circuit 104 as compared to the nominal frequency $f_n$. In this embodiment the PWM switching time (pulse width) should change as controlled by the frequency difference. In this embodiment one specific frequency means one light intensity level. For example, the nominal frequency 50 Hz could mean light intensity level 100%, while 75 Hz could mean light intensity level 30%, 100 Hz could mean light intensity level 10%, 125 Hz could mean light intensity level 3%, 150 Hz could mean light intensity level 1%. The frequency change is temporary and can be understood as a command to change light intensity. Otherwise, a certain circuit current, e.g. 2 A, may be used constantly.

It should be noted here that the regulatory organisations ICAO and FAA (international aviation regulation bodies) are studying what should be the correct lower limit for LED light intensity level (e.g. 1% or 3%). As LED usage is quite new to the airfield lighting systems, this lower limit has not yet been defined in regulation. With the above described power supply system the mentioned low limit of LED light intensity can be adjusted by selecting proper inverter output frequency, even after installation of the airfield lighting system at airports.

Using LED lamps and future LED lamp products may be cheaper as a power control system is not required in each lamp product. This is especially beneficial as the amount of runway and taxiway lamps may be quite huge at airports (in thousands of lamps per airfield, in up to few hundreds per one runaway/taxiway). This kind of airfield lighting system arrangement means that light intensity level response according to the inverter output frequency and inverter output voltage can be adjusted as needed, without adjusting airfield lighting circuit current, down to e.g. <0.5 A.

It may be beneficial to limit lower end of the range to e.g. 0.5 A because this remaining minimum current can be used to allow practical implementation accuracy in control of the inverter current output, and to power the lamp control circuits within the light units by the inverter output current without separate powering means.

Existing AFL systems controls light intensity by AFL current in range of 100% (6.6 A)-1% (2.8 A), originally specified for halogen lamps. Unfortunately, this is not directly suitable for modern LED lamps and therefore lamp manufacturers have added LED power controllers inside lamp units, increasing also lamp unit cost with more reliability risks. Using the above mentioned power supply system LED power controllers may not be needed inside the lamp units 105.

Additionally, new recent LED lamp based AFL systems can use also 100% (2.0 A) power range, which is difficult to implement with existing technology which would require control resolution of 20 mA, which is 1% of intensity and hard to achieve, but possible to implement with the above mentioned power supply system. As the above mentioned power supply system uses frequency based low light intensity control, the system does not suffer from the mentioned control resolution problem. The low airfield lighting circuit current is created inside transformer T1 and therefore outside of the inverter's internal controller function.

The transformers inside the lamp units 105 add inductance to the airfield lighting circuit, which further increases airfield lighting system sensitivity for frequency based light intensity control. This makes light intensity adjustments technically easier and reduces lamp costs.

It should be noted here that although the above description used airfield lighting, i.e. airfield ground lighting (AGL) systems as an example of the load for the power supply system, the same power control principle is also applicable to many other applications as well where light intensity control, power control for another purposes is needed.

The power network 101 may use 50 Hz or 60 Hz base frequency AC voltages but the present invention can also be used in other frequencies as well capable of transmitting required power to airfield lighting circuits. As a non-limiting example, the inverter output voltage frequency is in the range of 100-600 Hz in order to keep LED lights not blinking, because blinking might interference pilots in airplanes, and to reduce size of inductive components. However, any suitable frequency range can be used, e.g. 50-1000 Hz.

The present invention may also produce less EMI interferences. Using AC current in the airfield lighting circuit is a good option, as the sinusoidal AC voltage shape may minimize creation of EMI interferences. If the airfield lighting circuit uses relatively low power network frequency, a typical sinusoidal PWM power control in the airfield lighting circuit produces lots of switching losses, interferences (EMI) and light blinking. If the airfield lighting circuit would use e.g. PWM power control of the lamp driving current itself with quite high power levels (up to 40 kVA), the sharp PWM signal edges may generate significantly more EMI interferences and may create insulation problems in the airfield lighting circuit cables and transformers.

In the present invention higher, adjustable frequencies than the power network frequency may be used as the inverter unit output frequency which thus may provide inherently voltage amplitude adjustment within the airfield lighting circuit dividing the voltage between resistive and inductive loads (in T1 and lamp transformers LTn). When higher frequency is used, blinking and stroboscope effect may be reduced if not totally eliminated and less interferences (EMI) may be created due to simpler output voltage PWM modulation.

In the following, an additional feature, which may be used with the above described power supply arrangement, will be discussed in more detail in accordance with an embodiment, The additional feature may be used to deliver control messages to a load, e.g. for lamp control. The control messages are, for example, binary control messages. This may be performed e.g. as follows. A change of the output frequency of the constant current regulator unit 102 can have a meaning for devices connected to its output. Different frequencies can be used as a messages or control signals, thus eliminating the use of separate control paths. As an example, a part of the airfield lighting lamps 105 can be turned on/off to partially lighting a taxiway without a separate lamp control circuit or cables.

Information may carried by the control messages e.g. so that there is a single change in the output frequency of the constant current regulator unit 102, or a sequence of multiple frequency changes. If multiple changes are used, each single change (frequency value) can be used to add information to the message being transmitted. This method increases the amount of different available messages, e.g. communication bus addresses of receiving devices. Suitable frequency or frequency range can be used. For example, if a nominal output frequency of the constant current regulator unit 102 is 300 Hz, 330 Hz output frequency could mean bit "1" and 270 Hz output frequency could mean bit "0". Any feasible frequency values can be used. A sequence of consecutive frequency changes may thus form a binary code, e.g. a 16-bit word. Any suitable word length (number of bits) can be used.

FIGS. 9a-9c illustrate how information may be included in the output power as additional pulses. FIG. 9a illustrates a basic waveform where a sequence of pulses 901 (in this example the sequence comprises one pulse) is repeated so that pulses of each consecutive set has the opposite voltage level with respect to 0V. For example, a first set has positive pulses, the second set has negative pulses so that the absolute value of the pulses have substantially the same voltage level, the third set has again positive pulses, etc. When a lamp unit receives this kind of waveform it may have a rectifier and a pulse detector for detecting the information bits. The same waveform is also supplied to a power filter which forms the electric power for the illumination units. In the example of FIG. 9a no information is included wherein the detector may deduce that the rectified waveform is the basic waveform. On the other hand, FIG. 9b depicts an example in which each pulse is divided into two pulses so that these two pulses have substantially the same area (i.e. the same energy) than in the example of FIG. 9a. Thus, the same energy is provided to the illumination units but the detector may now determine that there are two pulses instead of one, wherein this additional pulse may be deduced to represent information. FIG. 9c illustrate yet another example waveform in which the basic pulse is divided into four separate pulses but so that those four pulses carry substantially the same energy than the one pulse of FIG. 9a and the two pulses of FIG. 9b. As an example, FIG. 9b could represent bit "1" and FIG. 9c could represent bit "0", or vice versa.

Due to the same energy carried by the pulses the power circuitry of the illumination units, which form the electric power for the lamp units from the input pulses, This appears as a sine wave in this example, also illustrated as a curve 902 in FIGS. 9a-9c.

To be able to process the information carried by the supplied power a receiving device (e.g. an airfield lighting lamp) has a circuitry which can recognize and demodulate the incoming transmitted information and can utilize this information for controlling its functioning, e.g. for controlling lamps to a correct intensity level. This can be implemented as an airfield lighting circuit selector module/function.

As another example, frequency modulation (FM) may also be used with the output of the constant current regulator unit 102. Hence, the output frequency may be varied according to the information to be transmitted.

If the frequency modulation based messaging implementation is used in the airfield lighting system, the lamp circuitry include means that can detect, receive and decode the mentioned frequency domain message and to form a control signal for the lamp 105. This kind of means can be a part of the output frequency detection circuit of the constant current regulator unit 102, which detects difference between nominal and actual airfield lighting circuit frequency, and further controls PWM pulse ratio for the power control of the lamp current.

Figure 7A:
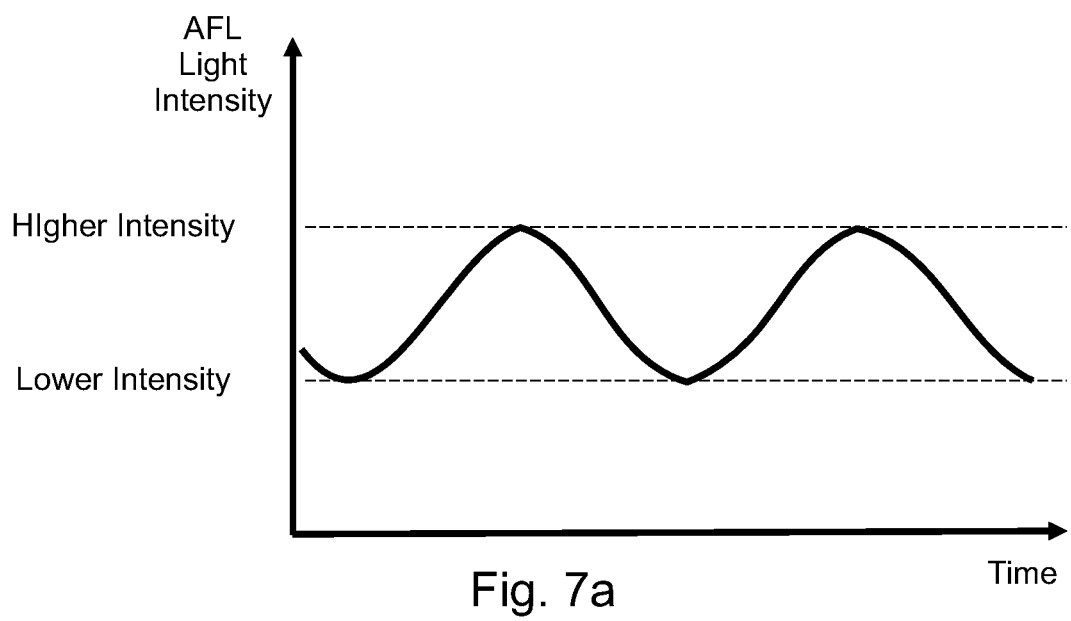
FIG. 7a illustrates the effect of using frequency sweeping in light intensity control, in accordance with an embodiment.

The present invention may also be used to produce varying intensity levels for the lamps for example by allowing the frequency to sweep a certain frequency range. An example of this is depicted in FIG. 7a. Hence, light intensity can be controlled without a need to use fixed light intensity levels. Using dynamically changing airfield lighting circuit frequency produces increasing or decreasing light intensity accordingly by changing the airfield lighting current accordingly. This produces dynamic airfield lighting illumination. This can be used e.g. as a new signal for airplane pilots. This kind of dynamically changing light intensity may be easier to detect than fixed light intensity. This can be beneficial in difficult visual conditions. This phenomenon resembles warning lights in traffic where dynamically changing blinking or intensity is used to attract attention.

Figure 7B:
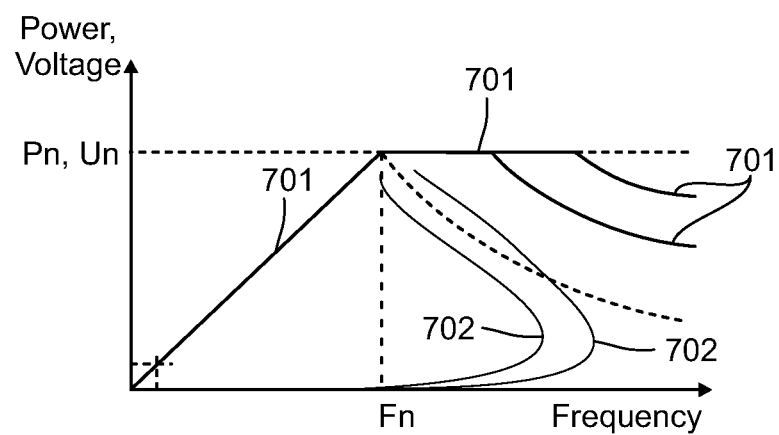
FIG. 7b illustrates a dynamic effect with a sinusoidal waveform, in accordance with an embodiment.

FIG. 7b illustrates the dynamic effect with a sinusoidal waveform, in accordance with an embodiment. The curves 701 illustrate two examples of an active control area and curves 702 illustrate two examples of frequency and voltage values at the output of the constant current regulator unit 102 when starting the operation of the power supply system. However, suitable other waveforms and feasible time domain rates of intensity changes can be used as well as any voltage/frequency combination for selecting operating point of the system, inside the active control area 701. When the system is started to ramp up power, higher frequencies and thus lower airfield lighting currents may be used and then gradually approaching higher power levels e.g. along the curve 702 shown in FIG. 7. Using higher frequencies for the airfield lighting current regulation may eliminate or at least decrease blinking and stroboscope problems that might otherwise be present—especially with low light intensities. Using higher frequency for the airfield lighting current regulation makes it also possible to calibrate required airfield lighting circuit current needed by different LED light colours—as amount of light brightness a LED produces at given current may vary according to the LED colour. Thus, this principle may make it easier to manufacture LED lamps with different colours, still using similar electrical components in them.

The frequency based adjustment may also have the advantage that lamp transformers LT2 may have larger leakage flux than in a situation in which only the voltage based adjustment is used. Hence, a primary winding and a secondary winding of the lamp transformer need not be tightly winded one over the other but, for example, a ringular core (e.g. a toroid) may be used so that the primary winding and the secondary winding are on opposite sides on the core or when a frame core is used, the primary winding and the secondary winding may be installed on different limbs of the core.

FIG. 10 illustrates an example of a power control principle in accordance with an embodiment. Depending on the desired power level, one or more of the frequency, the waveform and the output voltage of the supplied AC power is adjusted. If the desired power level is below the first threshold th1, only the waveform of the AC power is adjusted to obtain the desired power level. If the desired power level is between the first threshold th1 and the second threshold th2, the frequency, the waveform and the output voltage of the AC power can be adjusted to obtain the desired power level. If the desired power level is higher than the second threshold th2, only the output voltage of the AC power is adjusted to obtain the desired power level.

The invention is not solely limited to the above described embodiments but may be varied within the scope of the appended claims.

The invention claimed is:

1. An apparatus for supplying electric power to an electric device, the apparatus comprising:
    an indicator for obtaining an indication of a desired power level to be supplied to the electric device;
    an input for receiving electric power as DC power;
    an inverter for inverting the DC power to AC power; and
    a power supplier for supplying the AC power to a reactance to be transformed to an output power,
    wherein the apparatus further comprises: a power adjuster for adjusting the AC power supplied to the reactance by using at least two of the following:
    voltage level of the AC power;
    the frequency of the AC power; and
    a waveform of the AC power, wherein the apparatus further comprises: a comparator for comparing the desired power level to a first threshold and to a second threshold; wherein the power adjuster for adjusting the AC power are adapted to: adjust the frequency to obtain the desired power level, if the desired power level is between the first threshold and the second threshold; adjust the waveform to obtain the desired power level, if the desired power level is below the second threshold; and adjust the output voltage to obtain the desired power level, if the desired power level is higher than the first threshold.

2. The apparatus of claim 1, wherein the reactance comprises a transformer having a primary winding for receiving the AC power.

3. The apparatus of claim 2, wherein the transformer comprises a secondary winding for transforming the AC power to the output power.

4. The apparatus of claim 1, wherein the power supplier for supplying AC power are adapted to encode a control message into the output power.

5. The apparatus of claim 4, wherein the control message is formed by one of the following: a change in the frequency; a sequence of pulses.

6. The apparatus of claim 1, wherein the electric device is a lamp of an airfield lighting system.

7. The apparatus of any of the claim 1, wherein the power adjuster for adjusting the AC power comprises at least one of a switched mode power supply and a thyristor based power supply.

8. A method for supplying electric power to an electric device, the method comprising:
    obtaining an indication of a desired power level to be supplied to the electric device;
    receiving electric power as DC power by a constant current regulator unit;
    inverting the direct current to AC power;
    supplying the AC power to a reactance to be transformed to an output power; and
    supplying the output power from the reactance to the electric device, wherein the method further comprises:
    adjusting the AC power supplied to the reactance by using at least two of the following:
    voltage level of the AC power;
    the frequency of the AC power; and
    a waveform of the AC power, wherein the method further comprises: comparing the desired power level to a first threshold and to a second threshold; wherein the AC power is adjusted by: adjusting the frequency to obtain the desired power level, if the desired power level is between the first threshold and the second threshold; adjusting the waveform to obtain the desired power level, if the desired power level is below the second threshold; and adjusting the output voltage to obtain the desired power level, if the desired power level is higher than the first threshold.

9. The method of claim 8, wherein the reactance comprises a transformer having a primary winding, wherein the method comprises supplying the AC power to the primary winding.

10. The method of claim 9, wherein the transformer comprises a secondary winding, wherein the method comprises supplying the output power from the secondary winding.

11. The method of claim 8, wherein the method further comprises encoding a control message into the output power.

12. The method of claim 11, wherein the control message is formed by one of the following: a change in the frequency; a sequence of pulses.

13. The method of claim 8, wherein the AC power is adjusted by at least one of a switched mode power supply and a thyristor based power supply.

14. The method of claim 8, wherein the electric device comprises a light emitting diode, wherein the method comprises adjusting the AC power according to light illumination properties of the light emitting diode.

15. A system comprising:
    one or more electric devices;
    an apparatus for supplying electric power to the one or more electric devices; an indicator for obtaining an indication of a desired power level to be supplied to the electric device;
    an input for receiving electric power as DC power; an inverter for inverting the direct current to AC power; and
    a power supplier for supplying the AC power to a reactance to be transformed to an output power, wherein the system further comprises: a power adjuster for adjusting the AC power supplied to the reactance by using at least two of the following:

voltage level of the AC power;

the frequency of the AC power; and a waveform of the AC power, wherein the system further comprises: a comparator for comparing the desired power level to a first threshold and to a second threshold; wherein the power adjuster for adjusting the AC power are adapted to: adjust the frequency to obtain the desired power level, if the desired power level is between the first threshold and the second threshold; adjust the waveform to obtain the desired power level, if the desired power level is below the second threshold; and adjust the output voltage to obtain the desired power level, if the desired power level is higher than the first threshold.

16. An apparatus for supplying electric power to an electric device, the apparatus comprising:

an indicator for obtaining an indication of a desired power level to be supplied to the electric device;

an input for receiving electric power as DC power;

an inverter for inverting the DC power to AC power; and a power supplier for supplying the AC power to a reactance to be transformed to an output power, wherein the apparatus further comprises:

a power adjuster for adjusting the AC power supplied to the reactance by using at least two of the following:

voltage level of the AC power;

the frequency of the AC power; and a waveform of the AC power, wherein the apparatus further comprises: a comparator for comparing the desired power level to a first threshold; the power adjuster for adjusting at least one of the frequency and the waveform to obtain the desired power level, if the desired power level is at a first side of the first threshold; and the power adjuster for adjusting the output voltage to obtain the desired power level, if the desired power level is at a second side of the first threshold.

17. A method for supplying electric power to an electric device, the method comprising:

obtaining an indication of a desired power level to be supplied to the electric device;

receiving electric power as DC power by a constant current regulator unit;

inverting the direct current to AC power;

supplying the AC power to a reactance to be transformed to an output power; and supplying the output power from the reactance to the electric device, wherein the method further comprises:

adjusting the AC power supplied to the reactance by using at least two of the following:

voltage level of the AC power;

the frequency of the AC power; and a waveform of the AC power, wherein the method further comprises: comparing the desired power level to a first threshold; if the desired power level is at a first side of the first threshold, adjusting at least one of the frequency and the waveform to obtain the desired power level;

and if the desired power level is at a second side of the first threshold, adjusting the output voltage to obtain the desired power level.

18. A system comprising:

one or more electric devices;

an apparatus for supplying electric power to the one or more electric devices;

an indicator for obtaining an indication of a desired power level to be supplied to the electric device;

an input for receiving electric power as DC power; an inverter for inverting the direct current to AC power; and a power supplier for supplying the AC power to a reactance to be transformed to an output power, wherein the system further comprises: a power adjuster for adjusting the AC power supplied to the reactance by using at least two of the following:

voltage level of the AC power;

the frequency of the AC power; and a waveform of the AC power, wherein the system further comprises: a comparator for comparing the desired power level to a first threshold; the power adjuster for adjusting at least one of the frequency and the waveform to obtain the desired power level, if the desired power level is at a first side of the first threshold; and the power adjuster for adjusting the output voltage to obtain the desired power level, if the desired power level is at a second side of the first threshold.

* * * * *